United States Patent                    (10) Patent No.:    US 7,973,708 B2
Lee et al.                                (45) Date of Patent:       Jul. 5, 2011

(54) SYSTEM AND METHOD FOR DETECTING LOCATION USING DATA COMMUNICATION NETWORK

(75) Inventors: Hun Lee, Seoul (KR); Jin Hee Han, Gyeonggi-do (KR); Jeong Goo Lee, Seoul (KR); No Hyoung Lee, Seoul (KR)

(73) Assignee: Telace Inc., Seoul (KR)

( * ) Notice: Subject to any disclaimer, the term of this patent is extended or adjusted under 35 U.S.C. 154(b) by 0 days.

(21) Appl. No.: 12/651,786

(22) Filed: Jan. 4, 2010

(65) Prior Publication Data

US 2010/0201569 A1    Aug. 12, 2010

(30) Foreign Application Priority Data

Jan. 6, 2009   (KR) .................. 10-2009-0000876
Jun. 23, 2009  (KR) .................. 10-2009-0055945

(51) Int. Cl.
  *G01S 19/05*    (2010.01)
  *G01S 19/10*    (2010.01)
  *G01S 19/25*    (2010.01)

(52) U.S. Cl. .......... 342/357.42; 342/357.47; 342/357.64

(58) Field of Classification Search ............. 342/357.28, 342/357.29, 357.64, 342, 357.42, 357.43, 342/357.46–357.49, 357.51, 357.63; *G01S 19/05, G01S 19/10, 19/25*
See application file for complete search history.

(56) References Cited

U.S. PATENT DOCUMENTS

| 6,525,688 | B2 * | 2/2003 | Chou et al. ............... 342/357.29 |
| 7,233,798 | B2 * | 6/2007 | Drawert et al. ............. 455/456.1 |
| 7,450,062 | B2 * | 11/2008 | McBurney et al. ........ 342/357.4 |
| 7,574,218 | B2 * | 8/2009 | Forrester et al. ........... 455/456.1 |
| 7,609,201 | B2 * | 10/2009 | Masuda ................... 342/357.25 |
| 2006/0055596 | A1 * | 3/2006 | Bryant et al. ............. 342/357.06 |

FOREIGN PATENT DOCUMENTS

| KR | 10-2005-0014564 | 2/2005 |
| KR | 10-2005-0076319 | 7/2005 |
| KR | 10-2005-0092943 | 9/2005 |
| KR | 10-2007-0016795 | 2/2007 |

* cited by examiner

*Primary Examiner* — Thomas H Tarcza
*Assistant Examiner* — John B Vigushin
(74) *Attorney, Agent, or Firm* — Jenkins, Wilson, Taylor & Hunt, P.A.

(57) ABSTRACT

The present invention provides a global navigation satellite system (GNSS) based positioning system and tracking method using a data communication network. When a GNSS-based positioning device is connected to a data communication network, the positioning device transfers the GNSS digital data and supplementary information used for additional performance improvement to a location tracking server through the data communication network, the location tracking server calculates a position of the positioning device with improved receiver sensitivity based on plentiful computational resources available at the location tracking server. Thus, the positioning device may find its location of even in very poor signal condition. Further, the present invention provides a positioning system and method using a data communication network, which may achieve time synchronization when there is a need to extract not only position information but also absolute timing information.

14 Claims, 11 Drawing Sheets

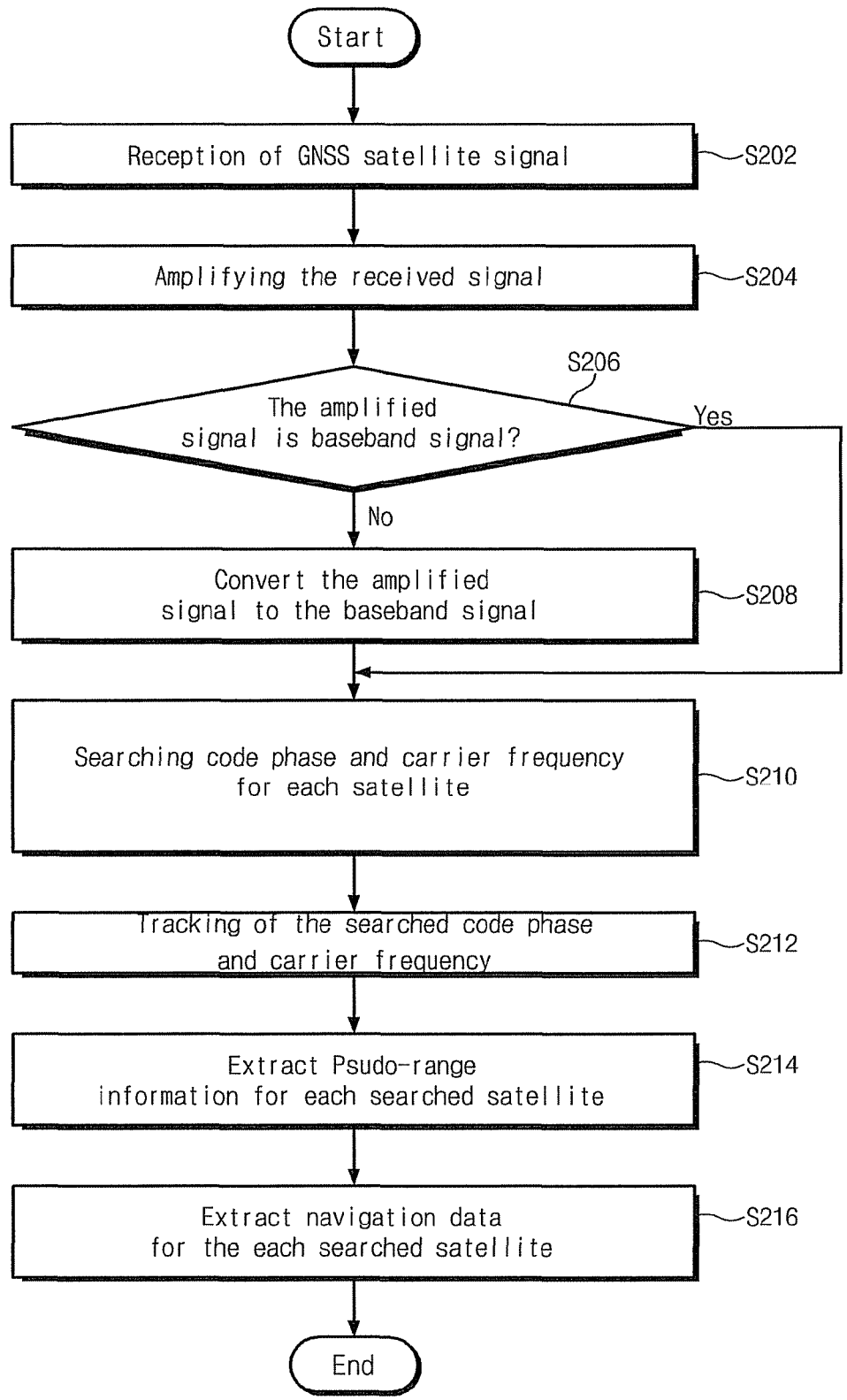

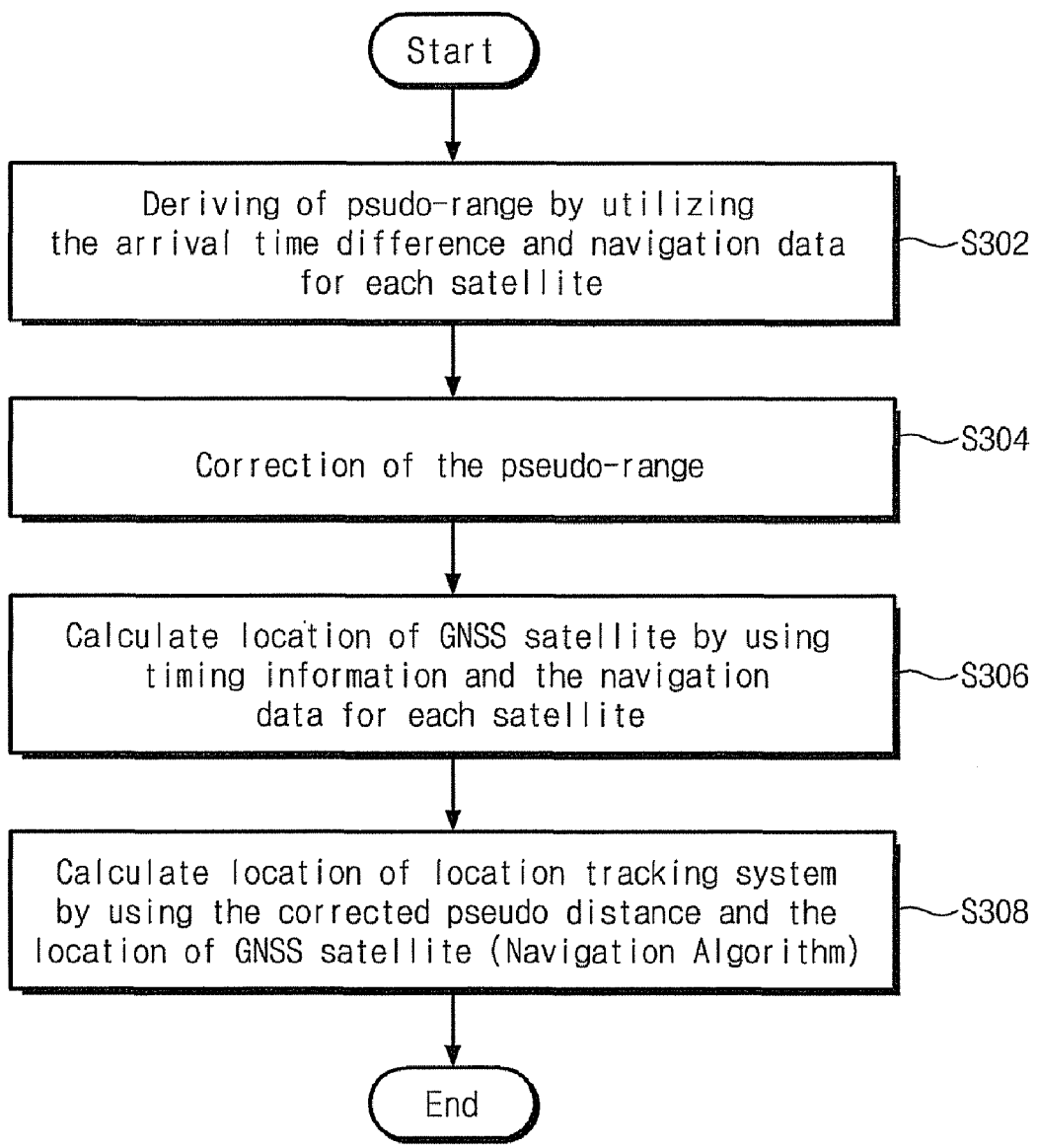

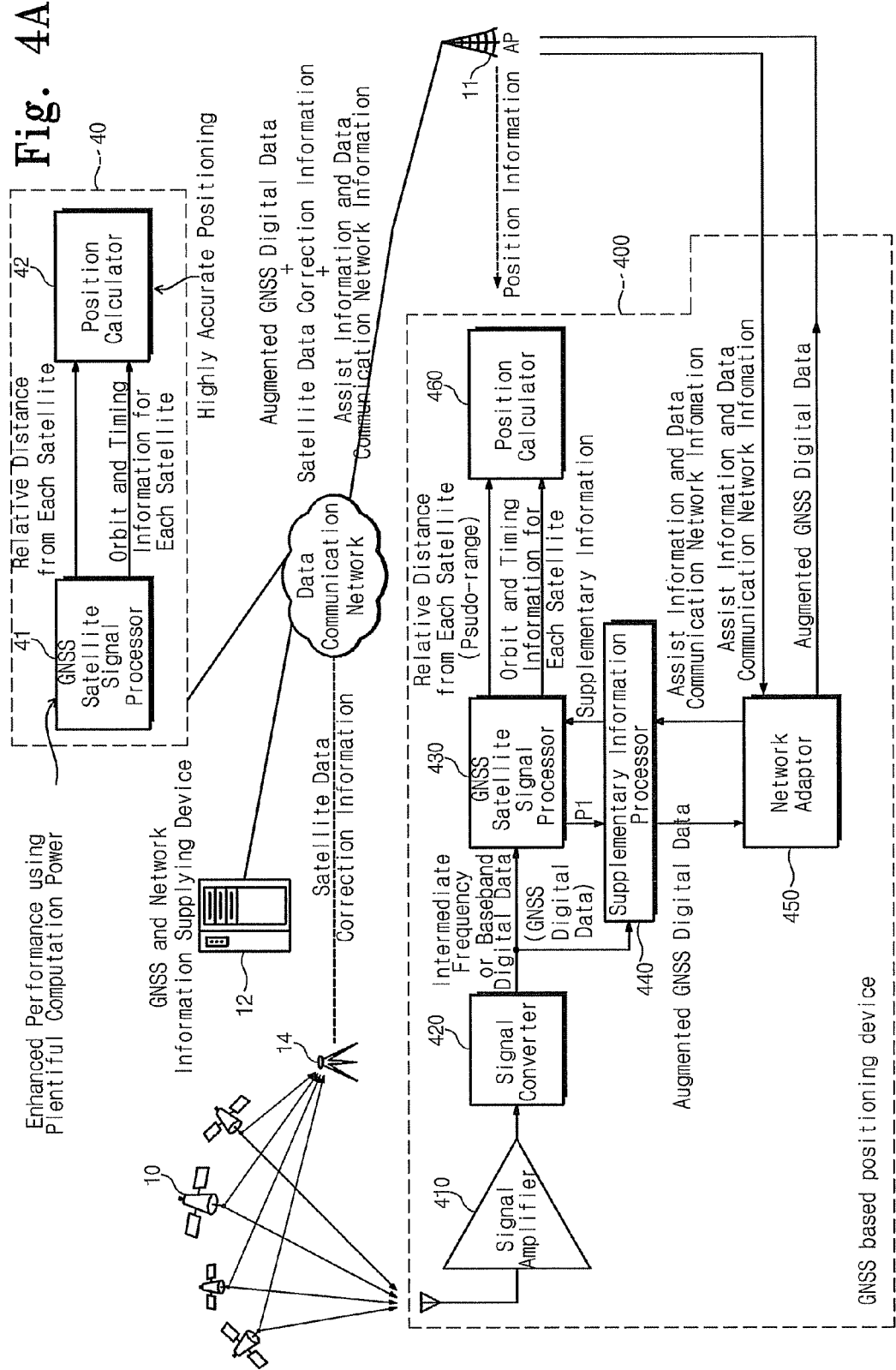

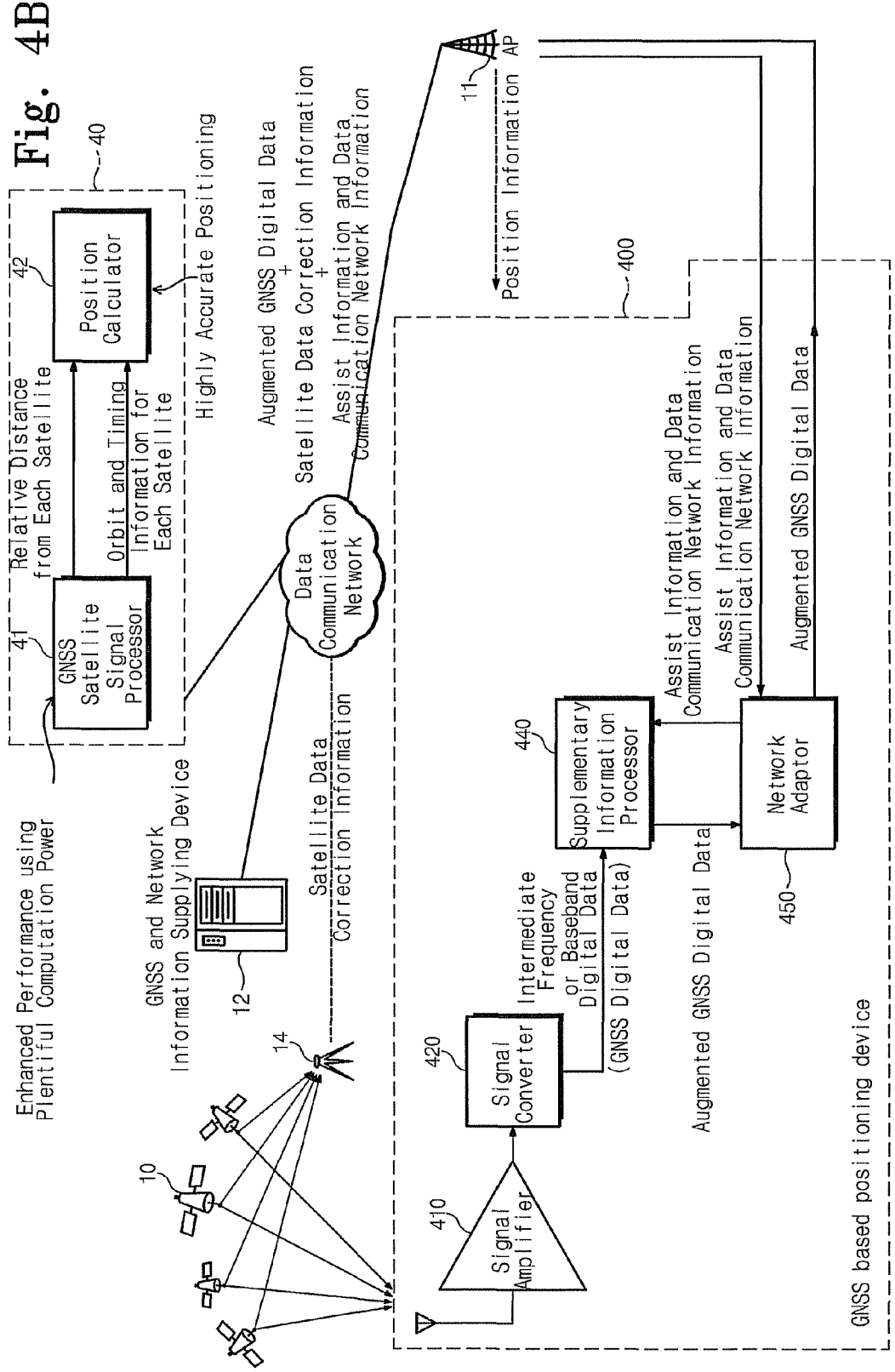

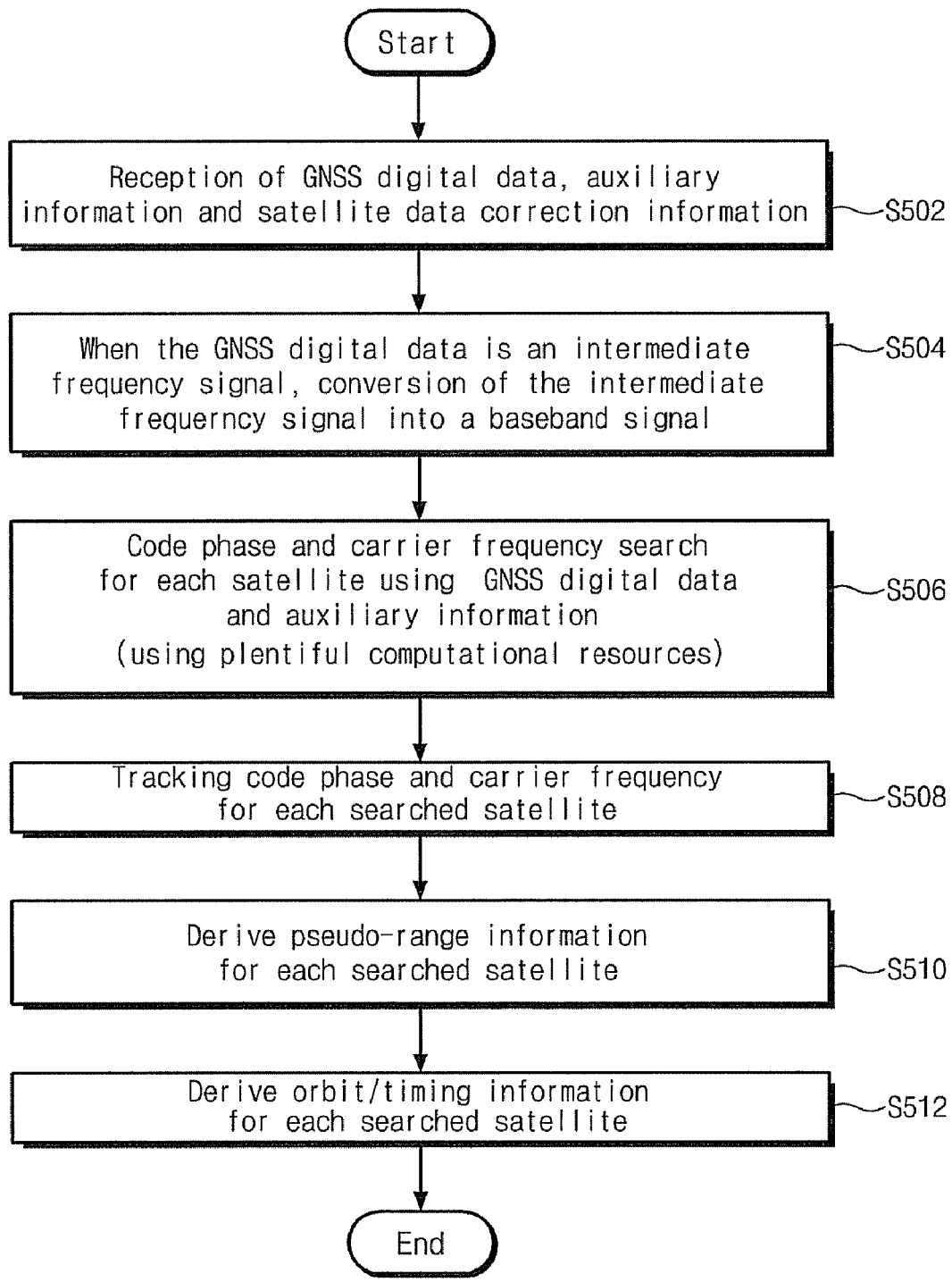

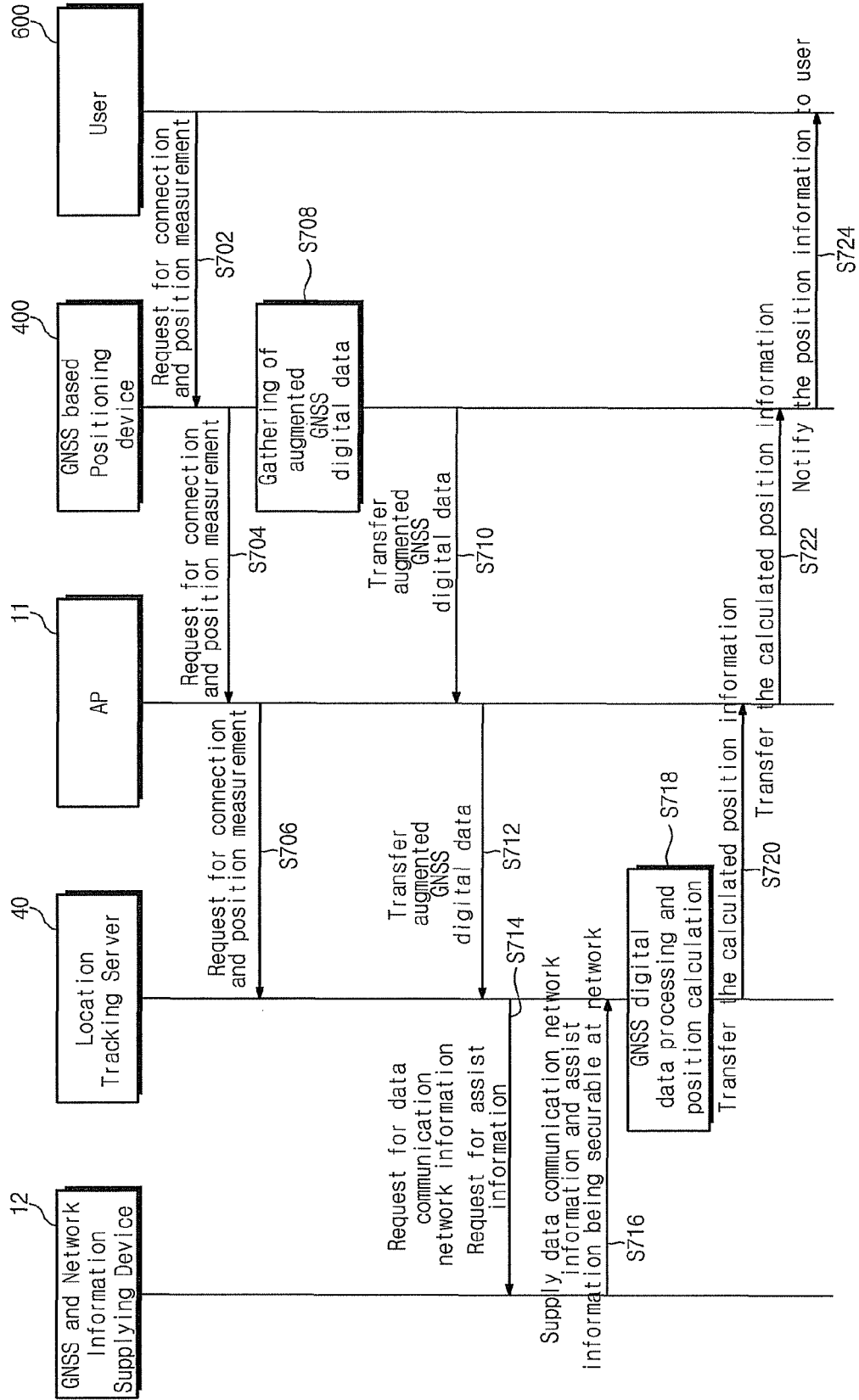

SYSTEM AND METHOD FOR DETECTING LOCATION USING DATA COMMUNICATION NETWORK

CROSS-REFERENCE TO RELATED APPLICATIONS

This U.S. non-provisional patent application claims priority under 35 U.S.C. §119 to Korean Patent Application No. 10-2009-0055945, filed on Jun. 23, 2009 and Korean Patent Application No. 10-2009-0000876, filed on Jan. 6, 2009, the entirety of which is hereby incorporated by reference.

BACKGROUND

1. Technical Field

The present invention is directed to a positioning system and method using a data communication network. If a positioning device transfers primitive GNSS digital data from GNSS satellites (e.g., intermediate frequency or baseband digital data) and additional information required for enhanced performance (e.g., timing information, cell-based information, bit data and carrier frequency shift information for each satellite) to a location tracking server by using a data network, the location tracking server calculates a position of the positioning device by enhancing receiver sensitivity utilizing plentiful computation power which is not realistic in the ordinary GNSS positioning devices. Thus, the positioning device may find its location even in very poor signal condition (e.g., the inside of a room or where the signal from GNSS satellites is severely attenuated). Such a GNSS-based positioning system may be applied to various location-based services.

Further, the present invention is directed to a positioning system and method using a data communication network, which may achieve time synchronization when there is a need to extract not only position information but also absolute timing information.

2. Description of Related Art

A global navigation satellite system (GNSS) is the standard generic term for satellite navigation systems that provide autonomous geo-spatial positioning with global coverage, which may include global positioning system (GPS), GLONASS, Galileo, Compass, etc. GPS is a GNSS developed and operated by the U.S. Department of Defense. In the case where a GPS is used, a GPS receiver receives a signal from 24 satellites orbiting the earth twice a day. Generally, a GPS receiver detects more than four satellite signals and it may find a location (longitude, latitude, and altitude) of the receiver with a series of signal processing operations.

In recent years, the usage of GNSS has been increased and extends to non-military (civilian) applications from its original military purposes. Moreover, applications of GNSS are spreading to wireless navigation systems and so forth. GPS has been widely used in not only simple wireless navigation systems but also location-based services. The Federal Communications Commission (FCC) enacted a compulsory regulation to identify a caller's location in an emergency call (911) to a communication carrier. Therefore, a positioning system using GNSS has become an essential, not auxiliary system.

A GNSS receiver continues to advance in performance. A terminal equipped with a GNSS receiver has no problem in identifying its location for the obstacle-free outdoor environments. However, when the signal strength from GNSS satellites is severely attenuated (e.g., for indoor or urban canyon environments), its location cannot be easily found by means of a conventional GNSS receiver.

Various location-based services are required to work in the indoor environment as well as in the outdoor environment. Especially an emergency situation, where the emergency user's position should be found, may happen at inside room or an area where the signal from GNSS satellites is heavily attenuated. Thus, the improvement of a GNSS-based positioning performance is required for various and advanced location-based services such as disaster or rescue services.

Various techniques have been developed to improve the performance of a GNSS receiver. However, it is very hard to improve the receiver sensitivity of a terminal by itself. That is, there is still a limitation in improving the performance of a GNSS receiver. Nonetheless, there are requirements for enhanced performance of the positioning technique.

GNSS has been popularly used to identify and track a location of a terminal. When three or four satellite signals from GNSS satellites are possible to be detected, a GNSS receiver may find a location of the terminal.

However, as set forth above, when a conventional GNSS receiver is located at inside room or an area where a signal from a GNSS satellite is heavily attenuated, it is difficult that the conventional GPS receiver detects three or four satellite signals at the same time. Thus, the location cannot be identified and tracked. In various location-based services, especially under an emergency or disaster situation, a GNSS-based positioning device is required to work even at an area where the received signal strength is very weak. Hence, the enhancement of the receiver sensitivity at a GNSS receiver is increasingly required in various and advanced location-based services.

SUMMARY

A feature of the present invention is to provide a GNSS-based positioning system and method using a data communication network. If a GNSS-based positioning device transfers primitive intermediate frequency or baseband digital data (hereinafter referred to "GNSS digital data") from GNSS satellites and, if required, auxiliary information (e.g., timing information, cell-related information, bit data and frequency shift information for each satellite) to a location tracking server through a data communication network, the location tracking server calculates a position of the GNSS-based positioning device by enhancing receiver sensitivity with plentiful signal processing resource, which cannot be realized at the positioning device side. Thus, the GNSS-based positioning system of the present invention may find a location of the positioning device even at an area where the location cannot be easily found (e.g., indoor or an area where the signal strength from GNSS satellites is very weak), and may be applied to various location-based services.

Another feature of the present invention is to provide a GNSS-based positioning system and method using a data communication network which may also achieve time synchronization when there is a need to find not only position information but also absolute timing information.

In order to achieve these features, an embodiment of the present invention provides a GNSS-based positioning system. The GNSS-based positioning device may include: a signal amplifier for amplifying a received satellite signal from GNSS satellites; a signal converter for converting the amplified satellite signal to a GNSS digital data; an supplementary information processor to self-extract additional information and generate supplementary information and augmented GNSS digital data with the GNSS digital data, the self-extracted additional information, and assist information and data communication network information; and a network adaptor for collecting the assist information and data communication network information from the data communication network and transferring the augmented GNSS digital data to a location tracking server through the data communication network.

The GNSS-based positioning system may further include: a satellite signal processor for processing the GNSS digital data, the supplementary information received from the supplementary information processor, the assist information and the data communication network information to derive a relative distance, and orbit/timing information for each satellite; and a position calculator for calculating the location of GNSS satellites by using the orbit/timing information for each satellite and then calculating the location of the positioning device by using the calculated location of GNSS satellites and the relative distance from each satellite.

In another embodiment, the GNSS-based positioning system may include: a signal amplifier for amplifying a received satellite signal from GNSS satellites; a signal converter for converting the amplified satellite signal to GNSS digital data; and a network adaptor for transferring the converted GNSS digital data to a location tracking server through a data communication network.

In order to achieve these features, an embodiment of the present invention provides a GNSS-based location tracking server. The GNSS-based location tracking server may include: a satellite signal processor for processing the GNSS digital data, the auxiliary information, the assist information, and the data communication network information to derive a relative distance and orbit/timing information for each satellite; and a position calculator for calculating the location of GNSS satellites by using the orbit/timing information for each satellite and then calculating the location of the positioning device by using the calculated location of GNSS satellites and the relative distance from each satellite.

In order to achieve these features, an embodiment of the present invention provides a GNSS-based positioning method. The GNSS-based positioning method may include: a signal amplifying step of amplifying a received satellite signal from GNSS satellites; a signal converting step of converting the amplified satellite signal to GNSS digital data; an assist information collecting step of collecting assist information and data communication network information; and a network adapting step of transferring the GNSS digital data and the collected supplementary information, if necessary, to a location tracking server through a data communication network.

The GNSS-based positioning method may further include: supplementary information extracting step of extracting the supplementary information used for positioning and combining the GNSS digital data with intermediate information, self-extracted additional information, the assist information, and the data communication network information. At the network adapting step, the GNSS digital data and the supplementary information are transferred to the location tracking server through the data communication network.

The GNSS-based positioning method further include: a satellite signal processing step of processing the GNSS digital data, the supplementary information, the assist information, and the data communication network information to derive a relative distance from each satellite and orbit/timing information for each satellite; and a position calculating step of calculating a location of the GNSS satellite by using the orbit and the timing information for each GNSS satellite and calculating a location of a positioning device by using the relative distance from each GNSS satellite.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention.

FIG. 2 is a detailed flowchart illustrating a conventional procedure of processing a satellite signal at a signal amplifier, a signal converter, and a GNSS satellite signal processor shown in FIG. 1A.

FIG. 3 is a detailed flowchart illustrating a conventional procedure of calculating a location at a position calculator.

FIGS. 4A to 4C are configuration diagrams of a GPS-based positioning system using a data communication network according to first to third embodiments of the present invention, respectively.

FIG. 5 is a detailed flowchart illustrating a procedure of processing a GNSS satellite signal at a location tracking server according to one embodiment of the present invention.

FIG. 7 is a flowchart illustrating a GNSS-based positioning method using a data communication network according to a second embodiment of the present invention.

DETAILED DESCRIPTION OF THE EMBODIMENTS

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art.

A positioning procedure at a conventional GNSS receiver will now be described below in brief. The positioning procedure may be classified into three cases, as follows:

In a first case, a GNSS receiver tracks GNSS satellite signal, and then calculates a position by itself using the extracted information from the tracked GNSS satellites.

In a second case, a GNSS receiver tracks a GNSS satellite signal by using assist information received from a network. Afterwards, the GNSS receiver calculates a position as in a first case. Tracking the GNSS satellite signal is executed at the GNSS receiver.

In a third case, a GNSS receiver tracks a GNSS satellite signal and provides information of the tracked satellite to a location tracking server of a network. Afterward, a position is calculated at the location tracking server. Tracking the GNSS satellite signal is also executed at the GPS receiver as in the second case.

The present invention is directed to not a conventional positioning system using a terminal based GNSS signal tracking but a positioning system for tracking and identifying the position of a GNSS-based positioning device based on a data communication network. A positioning device relays a primitive GNSS satellite data to a location tracking server through a connected data communication network, and the location tracking server searches and tracks GNSS satellites signal to calculate a position of the positioning device. The location tracking server can enhance the receiver sensitivity with plentiful signal processing resources to achieve an improved processing gain.

A typical GNSS-based positioning system will now be described with reference to FIGS. 1A to 1C.

Figure 1A:
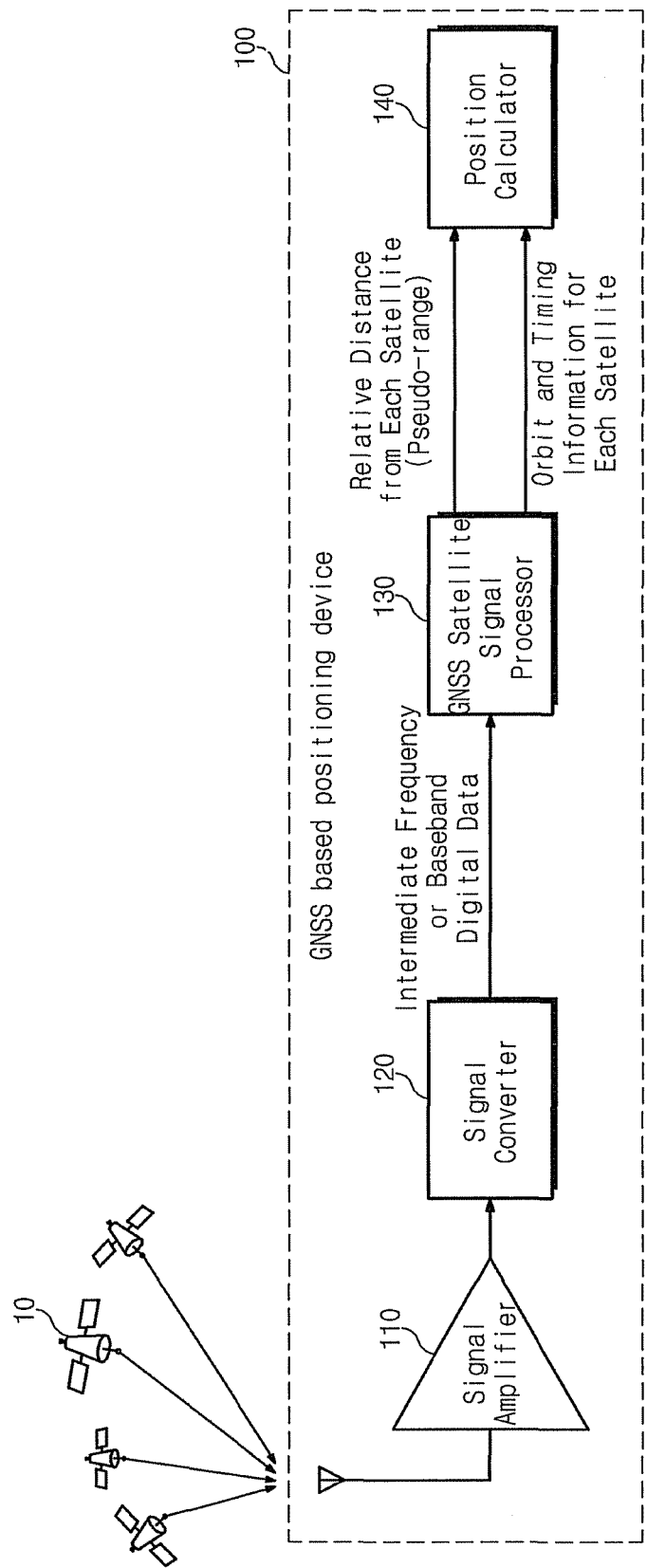
FIGS. 1A to 1C are configuration diagrams of a conventional GNSS-based positioning system.
Figure 1B:
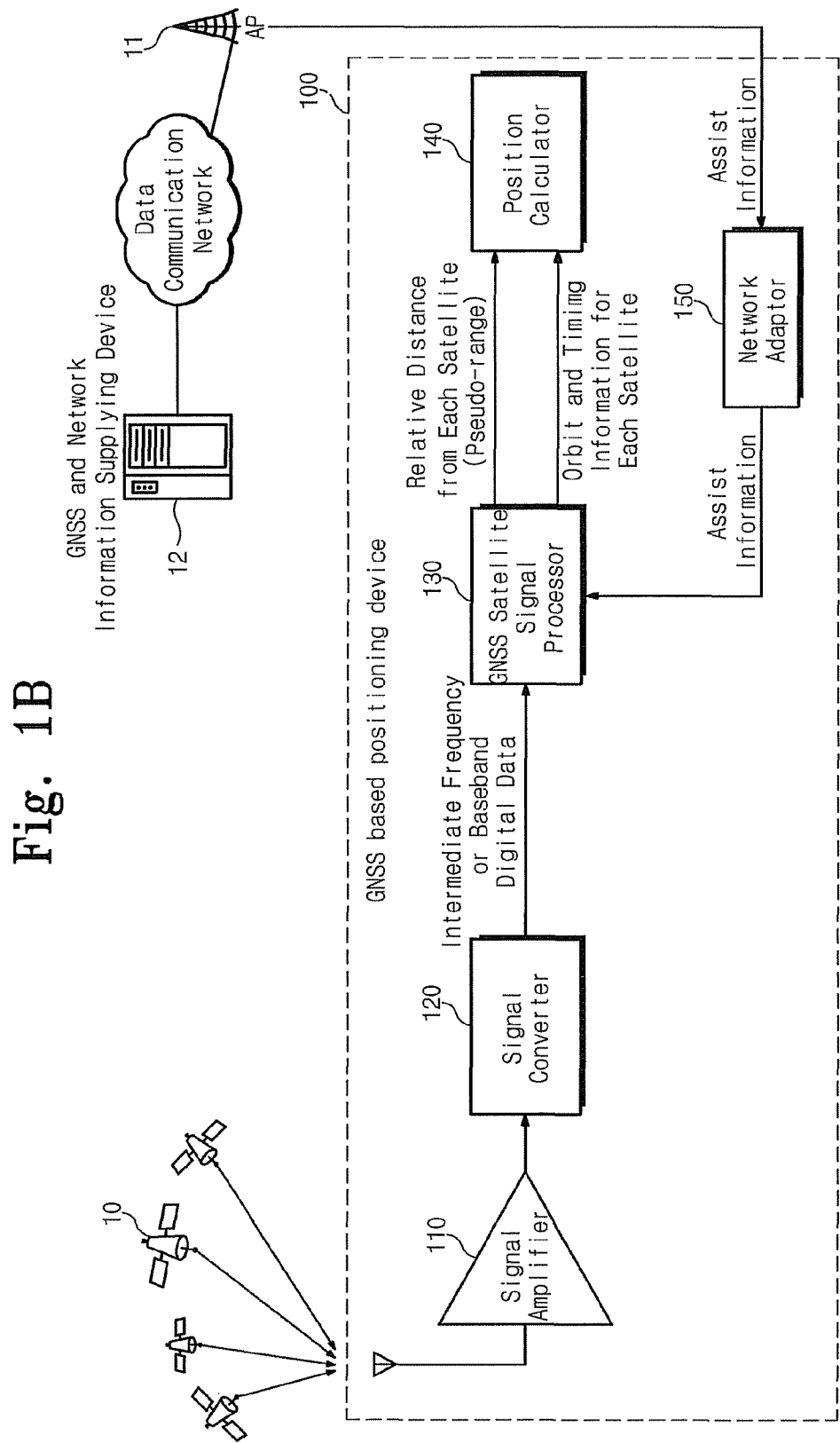
Figure 1C:
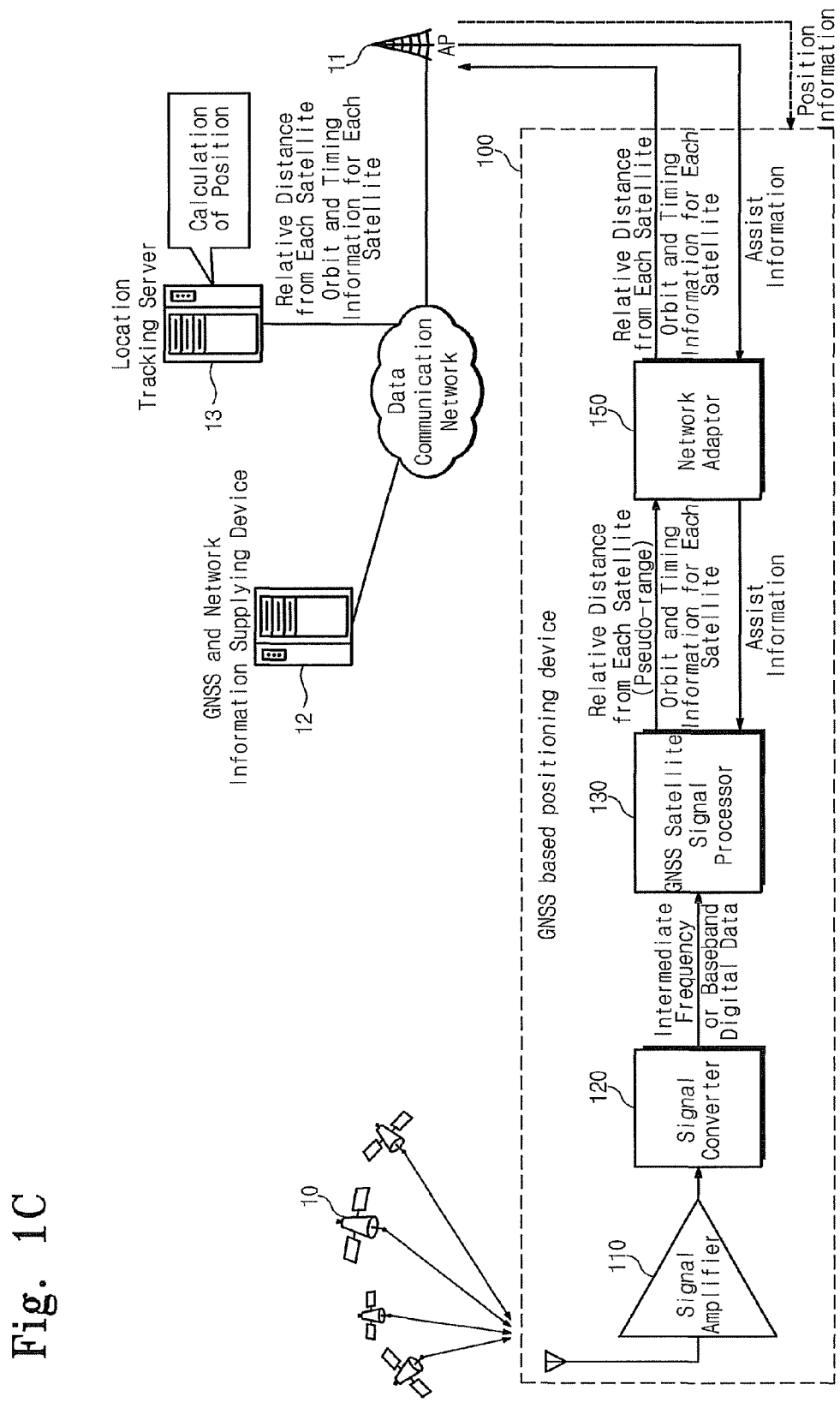

FIGS. 1A and 1C are configuration diagrams of a typical GNSS-based positioning system.

As illustrated in FIG. 1A, a typical GNSS-based positioning device 100 includes a signal amplifier 110, a signal converter 120, a GNSS satellite signal processor 130, and a position calculator 140. The GNSS-based positioning system 100 is a GNSS receiver, which executes a positioning operation with the received signal from multiple GNSS satellites 10.

Specifically, the signal amplifier 110 receives and amplifies the satellite signal from the GNSS satellites 10. The signal converter 120 converts the amplified satellite signal to GNSS digital data.

The GNSS satellite signal processor 130 processes the converted data to track the GNSS satellites 10. That is, the GNSS satellite signal processor 130 processes the GNSS digital data to obtain a relative distance from each satellite and orbit/timing information for each satellite.

The position calculator 140 derives its own location by using the location of the GNSS satellites 10 tracked and calculated by the GNSS satellite signal processor 130. That is, the position calculator 140 finds its own location by using the relative distance from each satellite, the orbit/timing information which is obtained by the GNSS satellite signal processor 130.

Similar to the above-mentioned first case, FIG. 1A shows a case where GNSS signal processing and positioning procedures are executed by itself without any connection to or assistance by a network.

As illustrated in FIG. 1B, another conventional positioning system 100 includes a signal amplifier 110, a signal converter 120, a GNSS satellite signal processor 130, a position calculator 140, and a network adaptor 150. That is, the positioning device 100 shown in FIG. 1B includes all the elements of the positioning device 100 shown in FIG. 1A, and further includes the network adaptor 150. The signal amplifier 110, the signal converter 120, the GNSS satellite signal processor 130, and the position calculator 140 have the same functions as those shown in FIG. 1A.

A difference between the positioning devices 100 in FIG. 1A and FIG. 1B is now be described. The network adaptor 150 is connected to an access point (AP) 11 of a network, and the AP 11 is connected to a GNSS and network information supplying device 12 through a data communication network. Thus, the network adaptor 150 receives assist information generated at the GNSS and network information supplying device 12 through the data communication network and transfers it to the GNSS satellite signal processor 130. The network adaptor 150 is connected to a network to partially enhance the performance of the positioning device 100 shown in FIG. 1B or to improve position calculating speed.

The GNSS satellite signal processor 130 obtains a relative distance from each satellite and orbit/timing information for each satellite by using the GNSS digital data and the assist information transferred by the network adaptor 150.

The position calculator 140 calculates a location by using the relative distance from each satellite and the orbit timing information for each satellite which are obtained at the GNSS satellite signal processor 130.

As shown in FIG. 1C, one another conventional positioning system 100 includes a signal amplifier 110, a signal converter 120, a GNSS satellite signal processor 130, and a network adaptor 150. That is, the positioning system 100 shown in FIG. 1C includes the signal amplifier 110 and the signal converter 120 shown in FIG. 1A and further includes a network adaptor 150. The signal amplifier 110 and the signal converter 120 of the positioning device 100 shown in FIG. 1C have the same functions as those of the positioning device 100 shown in FIG. 1A.

A difference between the positioning systems 100 in FIG. 1A and FIG. 1C is now described. The network adaptor 150 is connected to an AP 11 of a network, and the AP 11 is connected to a GNSS and network information supplying device 12 and a location tracking server 13 through a data communication network. Thus, the network adaptor 150 transfers assist information generated at the GNSS and network information providing device 12 to the GNSS satellite signal processor 130. In addition, the network adaptor 150 transfers a relative distance from each satellite and orbit/timing information for each satellite, which are obtained at the GNSS satellite signal processor 130, to a location tracking server 13 through the AP 11 and the data communication network.

The GNSS satellite signal processor 130 obtains a relative distance for each satellite and orbit and time information for each satellite by using the converted data and the assist information transferred from the network adaptor 150.

At the positioning device 100 shown in FIG. 1C, the network adaptor 150 transfers the processed information (the relative distance from each satellite, the orbit and timing information) to the location tracking server 13 through the data communication network. Thereafter, the location tracking server 13 calculates a location of the positioning device 100 shown in FIG. 1C by using the relative distance from each satellite and the orbit/timing information that are transferred from the network adaptor 150.

The typical GNSS-based positioning devices 100 shown in FIGS. 1A to 1C process a GNSS satellite signal, and tracks GNSS satellites 10 by itself. Thus, all the GNSS-based positioning systems 100 are still limited in receiver sensitivity and needs improvement of the receiver sensitivity, because the receiver sensitivity is mainly limited by the processing capability of the GNSS satellite signal processor.

FIG. 2 is a detailed flowchart illustrating a typical satellite signal processing procedure at the signal amplifier 110, the signal converter 120, and the GNSS satellite signal processor 130 shown in FIG. 1A.

The signal amplifier 110 receives a satellite signal from GNSS satellites 10 (S202). The signal amplifier 110 amplifies the received satellite signal (S204).

The signal converter 120 checks whether the amplified satellite signal is a baseband signal (S206) or not.

If the amplified satellite signal is not a baseband signal, the signal converter 120 converts the amplified satellite signal to a baseband signal (S208). On the other hand, if the amplified satellite signal is the baseband signal, the flow proceeds to S210.

The GNSS satellite signal processor 130 searches code phase and carrier frequency for each satellite from the converted baseband signal The GNSS satellite signal processor 130 tracks code phase and carrier frequency for the GNSS satellites 10 by using the searched code and frequency for each satellite (S212).

The GNSS satellite signal processor 130 derives pseudo range information for each satellite, i.e., a relative distance from each satellite by using the tracked code phase and carrier frequency information (S214).

The GNSS satellite signal processor 130 derives demodulated navigation data for each satellite, i.e., orbit/timing information for each satellite (S216).

That is, the GNSS satellite signal processor 130 searches and tracks code phase and carrier frequency for each satellite at a satellite signal. Also the GNSS satellite signal processor 130 extracts a difference between signal arrival instances (pseudo-range information) and navigation data for each satellite.

FIG. 3 is a detailed flowchart illustrating a typical position calculating procedure at the position calculator 140 shown in FIG. 1.

The position calculator 140 estimates a pseudo-range by using a difference between signal arrival instances for each satellite and navigation which are extracted at the GNSS satellite signal processor 130 (S302).

The position calculator 140 corrects the estimated pseudo-range according to the derived navigation data information (S304).

The position calculator 140 calculates the location of GNSS satellites 10 by using time information and navigation data for each satellite (S306).

The position calculator 140 calculates a location of a positioning device 100 by using the corrected pseudo-range and a location of GNSS satellites (S308). The position calculator 140 executes the location calculating procedure according to a well-known navigation algorithm.

FIG. 4A illustrates a GNSS-based positioning device 400 using a data communication network as a first embodiment of the present invention.

As illustrated in FIG. 4A, the positioning device 400 includes a signal amplifier 410, a signal converter 420, a GNSS satellite signal processor 430, a supplementary information processor 440, a network adaptor 450, and a position calculator 460.

The positioning device 400 is connected to a GNSS and network information supplying device 12 and a location tracking server 40 through an AP 11 and a data communication network. The location tracking server 40 includes a GNSS satellite signal processor 41 and a position calculator 42.

Elements of the positioning device 400 and the location tracking server 40 according to the first embodiment of the present invention will now be describe below in detail.

The signal amplifier 410 receives a satellite signal from GNSS satellites 10 and amplifies the received satellite signal.

The signal converter 420 converts the amplified satellite signal to GNSS digital data (intermediate frequency or baseband digital data). The converted GNSS digital data is transferred to the GNSS satellite signal processor 430 and the supplementary information processor 440.

The GNSS satellite signal processor 430 secures the GNSS digital data and additionally supplementary information from the supplementary information processor 440. The GNSS signal processor 430 searches code phase and carrier frequency of each GNSS satellite and yields a relative distance from each satellite and orbit/timing information for each satellite. The GNSS satellite signal processor 430 may transfer the relative distance and the orbit/timing information to the position calculator 460. When the received satellite signal condition is good, the GNSS satellite signal processor 430 is able to find relative distances and orbit/timing information for sufficient number (in general, more than 4) of GNSS satellites. In rather poor satellite signal condition, the GNSS satellite signal processor 430 cannot yield sufficient results for a position calculation at the position calculator 460. The GNSS satellite signal processor 430 may supply an intermediate information P1 (relative distances, orbit/timing information, and code phase and frequency search results for processed GNSS satellites) for the supplementary information processor 440, though the intermediate information P1 is not sufficient for a position calculation.

The supplementary information processor 440 receives assist information and data communication network information from the network adaptor 450. The supplementary information processor 440 combines the assist information and the data communication network information with self-generated additional information (e.g. frequency offset information of a local oscillator considering network synchronization with the AP 11, frequency offset control history information, etc) to generate the supplementary information. The supplementary information processor 440 transfers the supplementary information to the GNSS satellite signal processor 430. Also, the supplementary information processor 440 receives the intermediate information P1 from the GNSS satellite signal processor 430 and the GNSS digital data from the signal converter 420. The supplementary information processor 440 generates augmented GNSS digital data utilizing the GNSS digital data. The augmented GNSS digital data may include additionally at least one of the intermediate information P1, the self-generated additional information, the assist information, and the data communication network information.

The network adaptor 450 receives the assist information (e.g. orbital data, local ionospheric conditions and other errors affecting the satellite signal, etc.) and the data communication network information (e.g. cell-based information, approximate location information, timing information, frequency offset information, etc.) from the GNSS and network information supplying device 12 through the data communication network and the AP 11. The network adaptor 450 transfers the assist information and the data communication network information to the supplementary information processor 440. Also the network adaptor 450 receives an augmented GNSS digital data from the supplementary information processor 440. The network adaptor 450 transfers the augmented GNSS digital data to the location tracking server 40 through the AP 11 and the data communication network. When a data transmission rate of the data communication network is lower than a predetermined data transmission network capability, the network adaptor 450 transfers the augmented GNSS digital data to the location tracking serer 40 through the data communication network after storing the augmented GNSS digital data.

Basically, the location tracking server 40 tracks GNSS satellites 10 and calculates a location of the positioning device 400 by using the GNSS digital data, the self-extracted additional information, the assist information, the data communication network information, and satellite data correction information. The assist information and the data communication network information may be received from the positioning device 400 or from the GNSS and network information supplying server 12. The GNSS and network information supplying server 12 may provide assist information, coordinate information of home and neighbor cell sites, RSSI based rough location estimation information, etc. The location tracking server 40 calculates a location of the positioning device 400. The location tracking server 40 may transfer the calculated location information of the positioning device 400 back to the positioning device 400 through the data communication network and the AP 11.

Specifically, the GNSS satellite signal processor 41 receives the augmented GNSS digital data from the positioning device 400. The GNSS satellite signal processor 41, if necessary, gathers the assist information and the data communication network information from the GNSS and network information supplying server 12 and the satellite data correction information (e.g. the difference between the measured satellite pseudo ranges and actual (internally computed) pseudo ranges at a differential GNSS station 14) through the data communication network. Also the GNSS satellite signal processor 41 searches code phase and carrier frequency of the GNSS satellites. The GNSS satellite signal processor 41 demodulates the orbit/timing information with the augmented GNSS digital data. The searching and demodulating processes require a lot of computation. The computational amount of searching and demodulating processes can be reduced by using the assist information and the data communication network information. The computational amount of searching and demodulating processes can be further reduced by utilizing the intermediate information P1 and the self-generated additional information received from the positioning device. The processing time at the GNSS satellite signal processor 41 can be reduced by applying plentiful computational resources at the location tracking server 40. The searching and demodulating performance (e.g. receiver sensitivity) at the GNSS satellite signal processor 41 can be improved by plentiful computational resources at the location tracking server 40.

The position calculator 42 accurately calculates the position of the positioning device 400 by using the relative distance from each satellite, the orbit/timing information which is obtained by the GNSS satellite signal processor 41. Moreover, the position calculator 42 may extract absolute timing information using the results of the GNSS satellite signal processor 41, where the absolute timing information is extracted as interim information of the position calculation.

The positioning device 400 receives a satellite signal from the GNSS satellites to generate the GNSS digital data. Thereafter, the positioning device 400 transfers the secured GNSS digital data to the location tracking server 40 through the data communication network. When the GNSS digital data is transferred to the location tracking server 40 without any satellite signal processing, the required data throughput is relatively high. It is hard to transfer such large amount of data through a conventional communication network (especially, wireless communication network). However, the high transmission capability of a recent data communication network enables the GNSS digital data to be transferred sufficiently without any satellite signal processing (the data compression techniques may be introduced for an efficient implementation).

As in the case of FIG. 4A where the positioning device has its own GNSS satellite signal processor and position calculator, the positioning device 400 may calculate its position by itself when the satellite signal condition is good. In very poor satellite signal condition, the positioning device 400 may generate the intermediate information P1 and transfer it the location tracking server 40 to assist a position calculation of the positioning device 400.

FIG. 4B illustrates a GNSS-based location tracking system 400 using a data communication network according to a second embodiment of the present invention.

As illustrated in FIG. 4B, the positioning device 400 includes a signal amplifier 410, a signal converter 420, a supplementary information processor 440, and a network adaptor 450. The positioning device 400 is connected to a GNSS and network information supplying device 12 and a location tracking server 40 through an AP 11 and a data communication network. The location tracking server 40 includes a GNSS satellite signal processor 41 and a position calculator 42.

Elements of the positioning device 400 and the location tracking server 40 according to the second embodiment of the present invention will now be describe below in detail.

The signal amplifier 410 receives and amplifies a satellite signal from the GNSS satellites 10.

The signal converter 420 converts the amplified satellite signal to GNSS digital data. The converted GNSS digital data is transferred to the supplementary information processor 440.

The supplementary information processor 440 receives assist information and data communication network information from the network adaptor 450. The supplementary information processor 440 receives the GNSS digital data from the signal converter 420. The supplementary information processor 440 generates the augmented GNSS digital data utilizing the GNSS digital data. The augmented GNSS digital data may include additionally at least one of the self-generated additional information (e.g. frequency offset information of a local oscillator considering network synchronization with the AP 11, frequency offset control history information, etc), the assist information, and the data communication network information.

The network adaptor 450 receives the assist information (e.g. orbital data, local ionospheric conditions and other errors affecting the GNSS satellite signal, etc.) and the data communication network information (e.g. cell-based information, approximate location information, timing information, frequency offset information, etc.) from the GNSS and network information supplying device 12 through the data communication network and the AP 11. The network adaptor 450 transfers the assist information and the data communication network information to the supplementary information processor 440. Also the network adaptor 450 receives an augmented GNSS digital data from the supplementary information processor 440. The network adaptor 450 transfers the augmented GNSS digital data to the location tracking server 40 through the AP 11 and the data communication network. When a data transmission rate of the data communication network is lower than a predetermined data transmission network capability, the network adaptor 450 transfers the augmented GNSS digital data to the location tracking serer 40 through the data communication network after storing the augmented GNSS digital data.

The difference between the GNSS-based positioning systems in FIGS. 4A and 4B is whether the positioning device 400 has its own GNSS satellite signal processor 430 and the position calculator 460. When the positioning device is required to have self-positioning capability, the configuration in FIG. 4A is appropriate. The internal GNSS satellite signal processor and position calculator may be used to generate the intermediate information P1 even in very poor satellite signal condition. However, the positioning device can be configured as in FIG. 4B, when the positioning device 400 can access to a data communication network easily. For most location based services, FIG. 4B configuration is sufficient, and it can be implemented easily and economically.

Specifically, the GNSS satellite signal processor 41 receives the augmented GNSS digital data from the positioning device 400. The GNSS satellite signal processor 41, if necessary, gathers the assist information and the data communication network information from the GNSS and network information supplying server 12 and the satellite data correction information through the data communication network.

Also the GNSS satellite signal processor 41 searches code phase and carrier frequency of the GNSS satellites. The GNSS satellite signal processor 41 demodulates the orbit/timing information using the GNSS digital data. The demodulating and searching processes require a lot of computation. The computational amount of searching and demodulating processes can be reduced by using the assist information and the data communication network information. The computational amount of searching and demodulating processes can be further reduced by utilizing the self-generated additional information. The processing time at the GNSS satellite signal processor 41 can be reduced by applying plentiful computational resources at the location tracking server 40. The searching and demodulating performance (e.g. receiver sensitivity) at the GNSS satellite signal processor 41 can be improved by plentiful computational resources at the location tracking server 40.

The position calculator 42 accurately calculates the position of the positioning device 400 by using the relative distance from each satellite, the orbit/timing information which is obtained by the GNSS satellite signal processor 41. Moreover, the position calculator 42 may extract absolute timing information using the results of the GNSS satellite signal processor 41, where the absolute timing information is extracted as interim information of the position calculation.

Figure 4C:
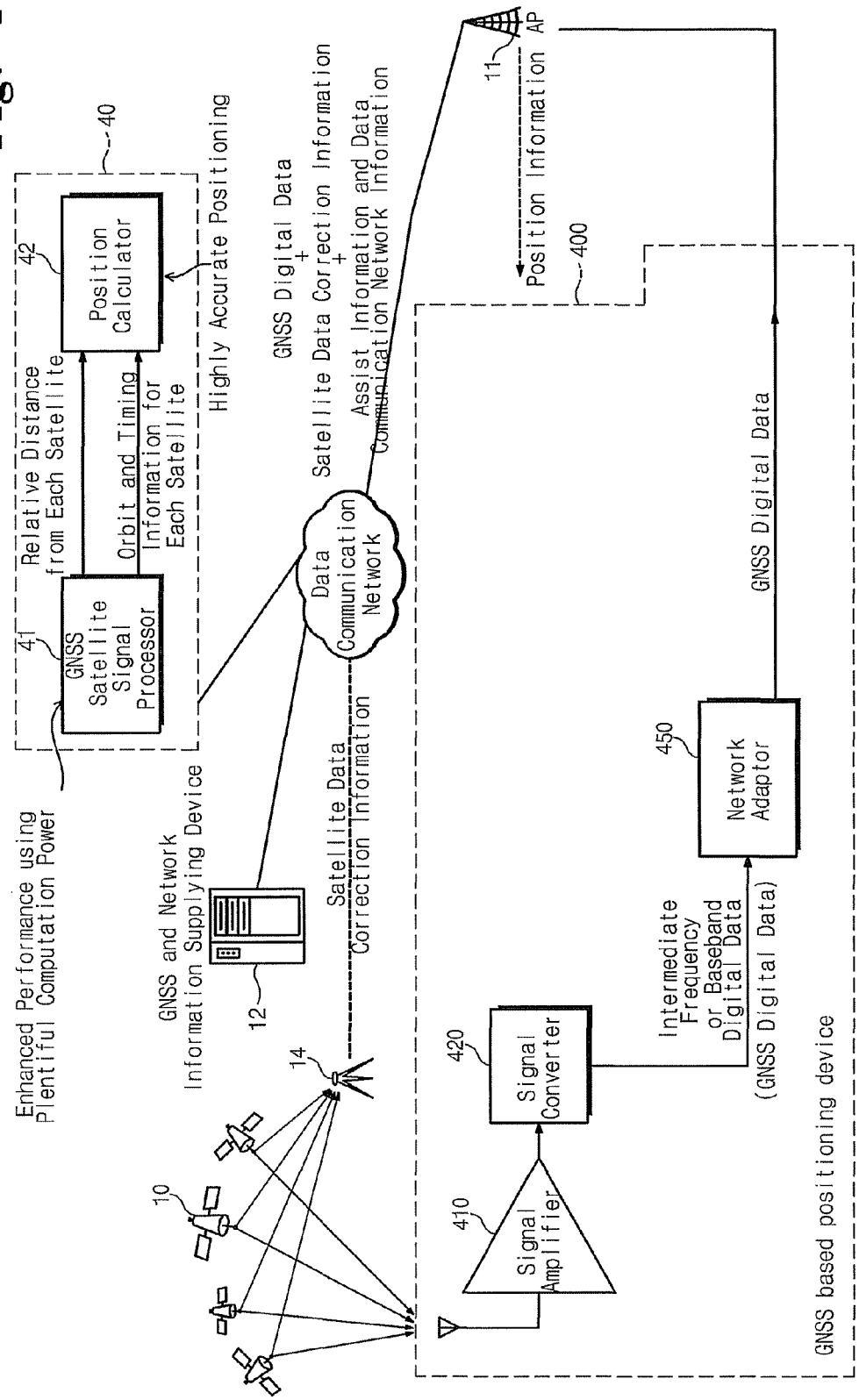

FIG. 4C illustrates a GNSS-based positioning device 400 using a data communication network according to a third embodiment of the present invention.

As illustrated in FIG. 4C, the GNSS-based positioning device 400 includes a signal amplifier 410, a signal converter 420, and a network adaptor 450.

The GNSS-based positioning device 400 is connected to a GNSS and network information supplying device 12 and a location tracking server 40 through an AP 11 and a data communication network. The location tracking server 40 includes a GNSS satellite signal processor 41 and a position calculator 42.

Elements of the GNSS-based positioning device 400 and the location tracking server 40 according to the third embodiment of the present invention will now be describe below in detail.

The signal amplifier 410 receives and amplifies a satellite signal from the GNSS satellites 10.

The signal converter 420 converts the amplified satellite signal to GNSS digital data. The converted GNSS digital data is transferred to the network adaptor 450.

The network adaptor 450 receives the GNSS digital data from the signal converter 420. The network adaptor 450 transfers the GNSS digital data to the location tracking server 40 through the AP 11 and the data communication network. When a data transmission rate of the data communication network is lower than a predetermined data transmission network capability, the network adaptor 450 transfers the GNSS digital data to the location tracking server 40 through the data communication network after storing the GNSS digital data.

The GNSS satellite signal processor 41 receives the GNSS digital data from the positioning device 400. The GNSS satellite signal processor 41, if necessary, gathers the assist information and the data communication network information from the GNSS and network information supplying server 12 and the satellite data correction information through the data communication network. Also the GNSS satellite signal processor 41 searches code phase and carrier frequency of the GNSS satellites. The GNSS satellite signal processor 41 demodulates the orbit/timing information using the GNSS digital data. The demodulating and searching processes require a lot of computation. The computational amount of for searching and demodulating processes can be reduced by using the assist information and the data communication network information. The processing time at the GNSS satellite signal processor 41 can be reduced by applying plentiful computational resources at the location tracking server 40. The searching and demodulating performance (e.g. receiver sensitivity) at the GNSS satellite signal processor 41 can be improved.

The position calculator 42 accurately calculates the position of the positioning device 400 by using the relative distance from each satellite, the orbit/timing information which is obtained by the GNSS satellite signal processor 41. Moreover, the position calculator 42 may extract absolute timing information using the results of the GNSS satellite signal processor 41, where the absolute timing information is extracted as interim information of the position calculation.

The typical GNSS based positioning device 100 may process a satellite signal of the GNSS satellite 10 and calculate a location of the positioning device for itself. However, a location tracking procedure in the GNSS-based positioning systems 400 shown in FIG. 4B or FIG. 4C is executed according to a self-generated demand or a request from a network.

FIG. 5 is a detailed flowchart illustrating a procedure of processing a GNSS satellite signal at a location tracking server according to one embodiment of the present invention.

A GNSS satellite signal processor 41 receives GNSS digital data, auxiliary information and satellite data correction information through a data communication network (S502). The auxiliary information may include at least one of intermediate information P1, self-generated additional information, assist information, and data communication network information.

When the received GNSS digital data is an intermediate frequency signal, the GNSS satellite signal processor 41 converts the intermediate frequency signal into a baseband signal (S504).

The GNSS satellite signal processor 41 searches code phase and carrier frequency for each satellite by using the GNSS digital data, the assist information, and the data communication network information and also by utilizing the auxiliary information (S506). The GNSS satellite signal processor 41 may apply the higher processing gain (compared to the case of "S210") by using plentiful calculation resources at the location tracking server 40.

Thereafter, the GNSS satellite signal processor 41 tracks the searched code phase and carrier frequency for GNSS satellites 10 (S508).

The GNSS satellite signal processor 41 derives pseudo-range information for each searched satellite, i.e., a relative distance from each satellite by using the tracked code phase and carrier frequency (S510).

The GNSS satellite signal processor 41 derives orbit/timing information for each searched satellite (S512).

Based on the baseband GNSS digital data, the GNSS satellite signal processor 41 executes de-spreading operation with a GNSS satellite signal to search a satellite signal and track a corresponding satellite.

Concerning the "S506" and "S508", when a positioning device 400 executes the "S506" and "S508" steps by itself, there is a limitation in performance at the positioning device. The positioning device 400 may not accurately derive code phase and carrier frequency of GNSS satellites 10 due to the huge amount of calculation required for a weak signal environment.

For example, a case where a received GPS satellite signal is accumulated in time is now described. In case of accumulating a GPS data bit of 20 ms which is considered as a general time-limit in GPS satellite signal searching, a processing gain of about 43 dB is obtained ideally. If the accumulation length of 20 ms is lengthened to one second (1 sec) such that the process gain is further increased by about 17 dB, the integration length and the search frequency resolution should be 50 times longer and more precise, respectively. That is, the positioning device 400 requires 2,500 times large amount of calculation and storage space. The large amount of calculation makes the practical performance limit of a self-calculating positioning device.

Unlike the satellite signal processing is executed at the positioning device by itself as in a typical GNSS-based positioning device, the GNSS satellite signal processor 41 at the location tracking server 40 may use plentiful computation resources to obtain a high processing gain. Therefore, the enhanced receiver sensitivity may be achieved in the present invention.

The GNSS satellite signal processor 41 searches code phase and carrier frequency for GNSS satellites efficiently by using self-generated additional information, assist information, data communication network information, and intermediate information at the location tracking server 40. Accordingly, it is possible to obtain higher receiver sensitivity than that obtained at the typical GNSS-based positioning device. Moreover, the signal processing is executed more efficiently to improve a signal processing speed.

In the GNSS satellite signal processor 41, the searching uncertainty range for code phase and carrier frequency is determined based on the priori information accuracy. If the GNSS satellite signal processor 41 knows accurate timing and frequency shift information of a local clock, the calculation time at the GNSS signal processor 41 can be shortened drastically. The satellite signal processor 41 may gather cell based information from the AP 11 and the self-generated additional information from the positioning device 400. The cell based information may include the oscillator frequency offset and the timing information of the positioning device 400 based in the network synchronization with the AP 11 to which the positioning device 400 belongs. The GNSS satellite signal processor 41 may enhance the accuracy of the prior information based in the cell based information and the self-generated additional information.

Knowing bit data for each satellite means that the GNSS satellite signal processor 41 in advance knows the bit data which changes every bit duration (20 msec for GPS). The GNSS satellite signal processor 41 may increase coherent correlation length by applying the bit data for each satellite to obtain a high processing gain. Further, the GNSS satellite signal processor 41 may apply the bit data to a high-resolution frequency tracking operation to accurately track the carrier frequency.

Figure 6:
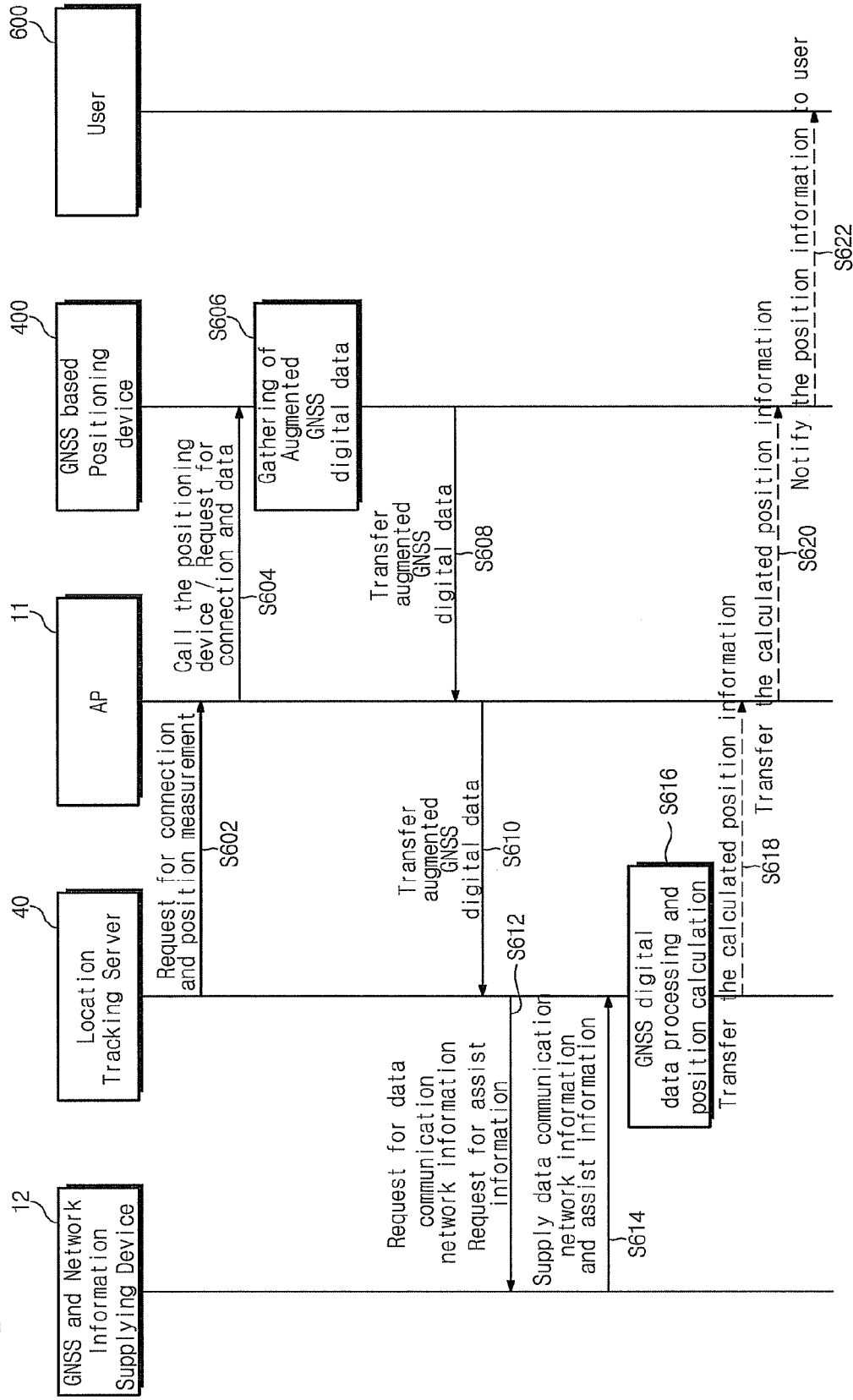
FIG. 6 is a flowchart illustrating a GNSS-based positioning method using a data communication network according to a first embodiment of the present invention.

FIG. 6 is a flowchart illustrating a GNSS-based positioning method using a data network according to a first embodiment of the present invention.

More specifically, FIG. 6 is a flowchart illustrating a location tracking server initiated positioning method using a GNSS and network information supplying device 12, a location tracking server 40, an AP 11, and a data communication network between a positioning device 400 and a user 600.

When there is a need to calculate a location of the positioning device 400 of the user 600, the location tracking server 40 accesses a data communication network to request the AP 11 to measure the location of the positioning device 400 (S602).

After calling and accessing the positioning device 400 through the data communication network, the AP 11 transfers the request for the location of the positioning device 400 (S604).

The positioning device 400 gathers augmented GNSS digital data including the GNSS digital data and auxiliary information, if necessary (S606). The auxiliary information may include at least one of assist information, data communication network information, self-generated additional information (e.g. frequency offset information of a local oscillator considering network synchronization with the AP 11, frequency offset control history information, etc), and intermediate information P1.

The positioning device 400 transfers the secured GNSS digital data and auxiliary information to the AP 11 (S608).

The AP 11 transfers the augmented GNSS digital data received from the positioning device 400 to the location tracking server 40 (S610).

The location tracking server 40 may request assist information to the GNSS and network information supplying device 12 (S612). Then the GNSS and network information supplying device 12 gives the data communication network information and assist information which can be secured at a network (S614).

When GNSS digital data, data communication network information, and assist information required for positioning are collected at the location tracking server 40, the location tracking server 40 executes a GNSS satellite signal processing and calculates a location of the positioning device 400 (S616).

The location tracking server 40 may transfer the calculated position information to the AP 11 (S618). Afterwards, the AP 11 relays the transferred position information to the positioning device 400 (S620).

When there is a need to notify the calculated position information to the user 600, the positioning device 400 may inform the position information of the user 600 and allow the user 600 to find its location.

The server initiated positioning method based on the steps from "S602" to "S622" may be applied to various location based services such as finding-friend or emergency rescue services.

FIG. 7 is a flowchart illustrating a GNSS-based positioning method using a data network according to a second embodiment of the present invention.

More specifically, FIG. 7 is a flowchart illustrating a user initiated positioning method using a GNSS and network information supplying device 12, a location tracking server 40, an AP 11, and a data communication network between a location tracking system 400 and a user 600. Although steps in FIG. 7 are similar to those in FIG. 6, the location tracking method starts with the request by the user 600.

The user 600 requests or commands the positioning device 400 to execute location measurement (S702).

The positioning device 400 requests the AP 11 to perform the location measurement (S704). The AP 11 requests a location tracking server 706 to execute the location measurement (S706).

The positioning device 400 collects augmented GNSS digital data including GNSS digital data and auxiliary information, if necessary (S708). The auxiliary information may include at least one of assist information, data communication network information, self-generated additional information (e.g. frequency offset information of a local oscillator considering network synchronization with the AP 11, frequency offset control history information, etc), and intermediate information P1.

Also, the positioning device 400 transfers the collected GNSS digital data and the auxiliary information to the AP 11 (S710).

The AP 11 transfers the auxiliary GNSS digital data received from the positioning device 400 to the location tracking server 40 (S712).

The location tracking server 40 may request assist information and data communication network information of the GNSS and network information supplying device 12 (S714). Then the GNSS and network information providing device 12 transfers the assist information and the data communication network information which may be secured at a network to the location tracking server 40 (S716).

When the GNSS digital data, assist information, and data communication network information required for positioning are collected at the location tracking server 40, the location tracking server 40 processes a GNSS satellite signal and calculate a position of the GNSS based position device 400 (S718).

The location tracking server 40 transfers the calculated position information to the AP 11 (S720). Afterwards, the location tracking server 40 transfers the transferred position information to the positioning device 400 (S722).

Because the procedure is initiated by the user request, the positioning device 400 informs the position information to the user 600 (S724).

The location tracking method based on the steps "S702" to "S724" may be applied to know a location of a terminal according to a request of a user 600. For example, the location tracking procedure may be applied to various cases such as a situation requiring especially high accuracy, distress, and location logging of a specific terminal (e.g., GPS-based location logging of an apparatus such as a camera).

On the other hand, the positioning method according to the present invention may be embodied by generating a computer program. Codes and segment codes constituting the program may be readily inferred by those skilled in the art. The generated program is stored in a recording medium (information storage medium) that a computer can read and is read and executed by the computer to embody the positioning method. In addition, the recording medium includes all types of recording medium that a computer can read.

As explained so far, according to the present invention, if a positioning device connected to a data communication network transfers GNSS digital data and auxiliary information to a location tracking server through a data communication network, the location tracking server calculates a position of the positioning device by enhancing the receiver sensitivity utilizing plentiful computational resources at the location tracking server. Thus, the location of a positioning device can be calculated and tracked even at an area where the GNSS satellite signal is severely attenuated. The positioning system of the present invention can be applied to various location-based services.

Further, according to the present invention, the time synchronization can be achieved at a positioning system and with a positioning method using a data communication network because the absolute timing information can be readily extracted as interim information of the position calculation.

In addition to the enhancement of the receiver sensitivity, the positioning accuracy can be significantly improved with plentiful computational power at the location tracking server to provide a high-reliable location service. Thus, the improved sensitivity and accuracy may be applied to location detection, storage, and logging of a GNSS receiver by a network or user's request according to various situations and applications.

Although the present invention has been described in connection with the embodiment of the present invention illustrated in the accompanying drawings, it is not limited thereto. It will be apparent to those skilled in the art that various substitutions, modifications and changes may be made without departing from the scope and spirit of the invention.

What is claimed is:

1. A global navigation satellite system (GNSS) based positioning system, comprising:
    a location tracking server; and
    a GNSS positioning device connected to the location tracking server through an access point and data communication network,
    wherein the GNSS positioning device comprises:
    a signal amplifier for amplifying a satellite signal after receiving the same from a GNSS satellite;
    a signal converter for converting the amplified satellite signal to GNSS digital data (intermediate frequency or baseband digital data);
    a supplementary information processor to extract supplementary information used for positioning, and integrate the supplementary information with the GNSS digital data to generate augmented GNSS digital data; and
    a network adaptor for transferring the augmented GNSS digital data to the location tracking server through the data communication network;
    wherein the network adaptor transfers the augmented GNSS digital data to the location tracking server through the data communication network in real time when a data transmission rate of the data communication network is equal or greater than a predetermined data transmission rate, and transfers the augmented GNSS digital data to the location tracking server through the data communication network after storing the augmented GNSS digital data when the data transmission rate of the data communication network is lower than the predetermined data transmission rate.

2. The GNSS-based positioning system of claim 1, wherein the location tracking server comprises:
    a GNSS satellite signal processor for processing the GNSS digital data, the supplementary information, and assist information from a GNSS and network information supplying device to derive a relative distance from each GNSS satellite to the GNSS positioning device and orbit and timing information for each GNSS satellite; and
    a position calculator for calculating a location of each GNSS satellite by using the orbit and timing information for each GNSS satellite and calculating a location of the GNSS positioning device by using the calculated location of each GNSS satellite and the relative distance from each GNSS satellite to the GNSS positioning device.

3. The GNSS-based positioning system of claim 2, wherein the position calculator calculates the arrival time instance of the GNSS digital data by using the calculated location of each GNSS satellite and the relative distance from each GNSS satellite to the GNSS positioning device.

4. The GNSS-based positioning system of claim 1, wherein the supplementary information processor extracts at least one of frequency offset information of a local oscillator considering network synchronization with the access point, frequency offset control history information, timing information, cell-based information, data bit for each GNSS satellite, and frequency shift information as the supplementary information required for GNSS-based positioning using the data communication network.

5. A GNSS-based positioning device comprising:
a signal amplifier for amplifying a satellite signal after receiving the same from a GNSS satellite;
a signal converter for converting the amplified satellite signal to GNSS digital data;
a network adaptor for transferring the GNSS digital data to a location tracking server through a data communication network; and
a supplementary information processor for extracting supplementary information used for positioning and integrates the supplementary information with the GNSS digital data to generate augmented GNSS digital data;
wherein the network adaptor collects assist information through the data communication network and transfers the augmented GNSS digital data to the location tracking server through the data communication network; and
wherein the network adaptor transfers the augmented GNSS digital data to the location tracking server through the data communication network in real time when a data transmission rate of the data communication network is equal or greater than a predetermined data transmission rate, and transfers the augmented GNSS digital data to the location tracking server through the data communication network after storing the augmented GNSS digital data when the data transmission rate of the data communication network is lower than the predetermined data transmission rate.

6. A GNSS-based positioning method comprising:
a signal amplifying step of amplifying a satellite signal after receiving the same from a GNSS satellite;
a signal converting step of converting the amplified satellite signal to GNSS digital data;
an assist information collecting step of collecting assist information and data communication network information through a data communication network; and
a network adapting step of transferring the GNSS digital data to a location tracking server through the data communication network;
wherein at the network adapting step, the GNSS digital data is transferred the location tracking server through the data communication network in real time when a data transmission rate of the data communication network is equal or greater than a predetermined data transmission rate and transferred to the location tracking server through the data communication network after storing the converted GNSS digital data when the data transmission rate of the data communication network is lower than the predetermined data transmission rate.

7. The GNSS-based positioning method of claim 6, further comprising:
a supplementary information extracting step of extracting supplementary information used for positioning and combining the GNSS digital data with at least one of intermediate information, self-extracted additional information, the assist information, and the data communication network information,
wherein at the network adapting step, the GNSS digital data and the supplementary information are transferred to the location tracking server through the data communication network.

8. The GNSS-based positioning method of claim 7, wherein at the supplementary information extracting step, at least one of frequency offset information of a local oscillator considering network synchronization with an access point, frequency offset control history information, timing information, cell-based information, data bit for each GNSS satellite, and frequency shift information is processed as the supplementary information required for GNSS-based positioning.

9. The GNSS-based positioning method of claim 6, further comprising:
a GNSS satellite signal processing step of processing the GNSS digital data, the supplementary information, and the data communication network information to derive a relative distance from each GNSS satellite to a GNSS positioning device, and to derive orbit and timing information for each GNSS satellite; and
a position calculating step of calculating a location of each GNSS satellite by using the orbit and timing information for each GNSS satellite and calculating a location of a GNSS positioning device by using the calculated location of the GNSS satellite and the relative distance from each GNSS satellite to the GNSS positioning device.

10. The GNSS-based positioning method of claim 9, wherein at the position calculating step, the arrival time instance of the GNSS digital data is calculated by using the calculated location of each GNSS satellite and the relative distance from each GNSS satellite to the GNSS positioning device, and absolute timing information is extracted.

11. A global navigation satellite system (GNSS) based positioning system comprising:
a location tracking server; and
a GNSS positioning device connected to the location tracking server through an access point and data communication network, the GNSS positioning device comprising:
a GNSS a signal amplifier for amplifying a satellite signal after receiving the same from a GNSS satellite;
a signal converter for converting the amplified satellite signal to GNSS digital data; and
a network adaptor for transferring the GNSS digital data to a location tracking server through a data communication network; and
a supplementary information processor for extracting supplementary information used for positioning and integrating the supplementary information with the GNSS digital data to generate augmented GNSS digital data;
wherein the network adaptor receives and transfers the augmented GNSS digital data to the location tracking server through the data communication network after storing the augmented GNSS digital data when the data transmission rate of the data communication network is lower than the predetermined data transmission rate.

12. The GNSS-based positioning system of claim 11, wherein the location tracking server comprises:
a GNSS satellite signal processor for processing each of the GNSS digital data, the supplementary information, and assist information from a GNSS and network information supplying device to derive a relative distance from each GNSS satellite to the GNSS positioning device and orbit and timing information for each GNSS satellite; and
a position calculator for calculating a location of each GNSS satellite by using the orbit and timing information for each GNSS satellite and calculating a location of the GNSS positioning device by using the calculated location of each GNSS satellite and the relative distance from each GNSS satellite to the GNSS positioning device.

13. The GNSS-based positioning system of claim 12, wherein the position calculator calculates the arrival time instance of the GNSS digital data by using the calculated location of each GNSS satellite and the relative distance from each GNSS satellite to the GNSS positioning device.

14. The GNSS-based positioning system of claim 11, wherein the supplementary information processor extracts at least one of frequency offset information of a local oscillator considering network synchronization with the access point, frequency offset control history information, timing information, cell-based information, data bit for each GNSS satellite, and frequency shift information as the supplementary information required for GNSS-based positioning using the data communication network.

* * * * *